(12) United States Patent
Rasmussen

(10) Patent No.: US 7,157,064 B2
(45) Date of Patent: Jan. 2, 2007

(54) METHOD FOR TREATMENT OF FLUE GAS CLEANING PRODUCTS

(75) Inventor: Erik Rasmussen, Gentofte (DK)

(73) Assignee: Rastof OG Genanvendelse Selskabet AF 1990 A/S, Copenhagen S (DK)

( * ) Notice: Subject to any disclaimer, the term of this patent is extended or adjusted under 35 U.S.C. 154(b) by 290 days.

(21) Appl. No.: 10/181,967

(22) PCT Filed: Feb. 2, 2001

(86) PCT No.: PCT/DK01/00078

§ 371 (c)(1),
(2), (4) Date: Oct. 24, 2002

(87) PCT Pub. No.: WO01/56684

PCT Pub. Date: Aug. 9, 2001

(65) Prior Publication Data

US 2003/0105380 A1 Jun. 5, 2003

(30) Foreign Application Priority Data

Feb. 4, 2000 (DK) .............................. 2000 00185

(51) Int. Cl.
*B01D 53/50* (2006.01)
(52) U.S. Cl. .................................................. 423/240 R
(58) Field of Classification Search ............ 423/240 R, 423/241, 240 S
See application file for complete search history.

(56) References Cited

U.S. PATENT DOCUMENTS

| | | | |
|---|---|---|---|
| 5,478,447 A | 12/1995 | Ninane et al. | |
| 5,601,632 A | 2/1997 | Jensen | 75/743 |
| 5,743,469 A | 4/1998 | Reintanz | 239/518 |
| 5,785,935 A * | 7/1998 | Fristad et al. | 423/109 |
| 5,824,139 A | 10/1998 | Brüggendick | 96/109 |
| 5,840,263 A | 11/1998 | Shinoda et al. | 423/243.01 |
| 5,878,677 A | 3/1999 | Muller et al. | 110/345 |
| 6,180,074 B1 * | 1/2001 | Fourcot et al. | 423/210 |

FOREIGN PATENT DOCUMENTS

| | | |
|---|---|---|
| FR | 2 749 006 | 11/1997 |
| FR | 2 749 772 | 12/1997 |
| WO | WO97/16376 * | 5/1997 |
| WO | 99/28000 | 6/1999 |

* cited by examiner

*Primary Examiner*—Edward M. Johnson
(74) *Attorney, Agent, or Firm*—Jacobson Holman PLLC

(57) ABSTRACT

The invention relates to a method of treating a halogen containing solid or semi solid waste material from a flue gas cleaning process, wherein the amount of alkaline compounds is sufficient to provide a suspension of the waste material in water with a pH value of at least 10, said method comprising the steps of a) preparing an aqueous suspension of the solid or semi solid waste material, said suspension having a pH value of at least 10, b) separating the solid and the liquid material from each other to obtain an aqueous solution of waste material and a solid waste material, and collecting the solid waste material. The procedure is repeated one or more times, and optionally the resulting solid waste material is dried.

31 Claims, 2 Drawing Sheets

METHOD FOR TREATMENT OF FLUE GAS CLEANING PRODUCTS

Figure 1:
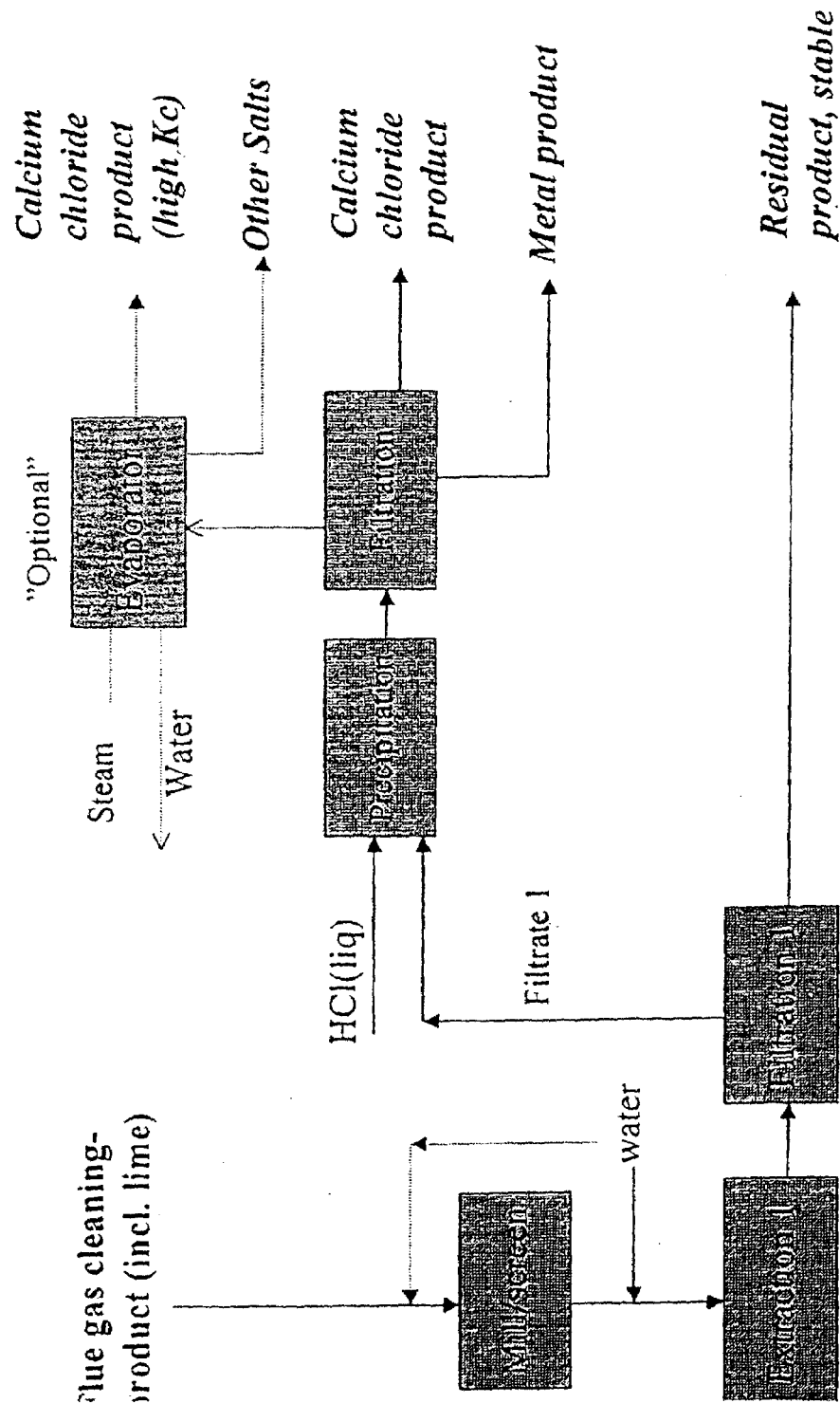

This is a nationalization of PCT/DK01/00078 filed Feb. 2, 2001 and published in English.

The present invention relates to a method of treating halogen containing solid waste material from a flue gas cleaning process.

Flue gasses from incinerators are normally cleaned from harmful substances in order to minimise pollution when the gas escapes to the air. Uncleaned flue gasses normally contain large amounts of acidic components, especially sulphur oxides and hydrochlorid acid gasses. Normally the flue gasses are cleaned in a flue gas scrubber, a fluidized bed reactor or similar device, wherein the flue gas is brought into contact with an alkaline cleaning agent or adsorbing agent in the form of an aqueous suspension of alkaline components or in form of a dry, particulated alkaline composition. Different flue gas cleaning methods and devices are described in e.g. U.S. Pat. Nos. 5,824,139, 5,743,469, 5,878, 677 and 5,840,263.

The alkaline cleaning agent used are normally solid alkaline components such as calcium carbonate, lime stone, dolomite calcium oxide, calcium hydroxide and the analogous alkaline earth metal compounds, which may or may not be suspended in water before or during the gas cleaning process. During the gas cleaning process only some of the alkaline components are react with the acidic components from the gas. The remaining unused alkaline cleaning components are removed together with the components, which have adsorbed or reacted with the harmful substances from the flue gas as a waste product. In most semi dry fly gas cleaning processes large amounts of the alkaline cleaning components e.g. up to about 25–50% remain unused and are removed as a part of the waste product.

In U.S. Pat. No. 5,878,677 is mentioned that the once used cleaning agent (sorbent) may be recirculated to the cleaning system. This may improve the utilisation of the cleaning agent, but still a lot of the alkaline components e.g. up to about 25% by weight in the cleaning agent remain unused. Furthermore the once used cleaning agent is very unstable. Normally such cleaning agents are stored on the ground optionally covered with a foil prior to its use. When moistured the heavy metal and halogen compound are leaking out from the cleaning agent and into the environment.

Generally the waste material obtained from a flue gas cleaning process, comprise large amounts of unused alkaline components together with the harmful substances absorbed from the flue gas, such as heavy metal and chloride Different method has been suggested for cleaning such waste products from halogen compounds and heavy metals. A typically method is e.g. described in WO 99/28000. This method generally includes removing the halogen compound by washing the waste material with an alkaline solution followed by a second washing step using acid at pH value below 4 for removing heavy metals. After the removal of halogen compounds and heavy metals the waste material may be discharge into the environment. This method requires, however, the use of large amounts of acids, particularly if large amounts of alkaline components are present in the waste material.

The object of the present invention is to provide an alternative method of treating a halogen containing solid or semi solid waste material from a flue gas cleaning process, which method converts the waste material into one or more product which can either be reused or which can be discharged into the environment.

A particular object of the present invention is to provide a method of converting a halogen containing solid or semi solid waste material from a flue gas cleaning process into one or more useful product, which method is simple and economical feasible.

A further object is to provide a method of converting a halogen containing solid or semi solid waste material from a flue gas cleaning process into a non-polluting waste product, which method is simple and economical feasible.

These and other objects are accomplished by the method as defined in the claims.

The method according to the invention specifically relates to the treatment of a halogen containing solid or semi solid waste material from a flue gas cleaning process, wherein the amount of alkaline compounds is sufficient to provide a suspension of the waste material in water with a pH value of at least 10.

Solid or semi solid waste material include from totally solid waste material to fluent waste material.

The feature that the amount of alkaline compounds should be sufficient to provide a suspension of the waste material in water with a pH value of at least 10, means in the present context that the pH value of the suspension should be at least 10 when mixing the waste material with about 50% by weight of pure water. In general this means that the solid or semi solid waste material, which can be treated according to the method of the invention contains large amounts of unused alkaline components.

The solid or semi solid waste material is preferably a waste material obtained from cleaning flue gasses from power plants, industrial waste gases from waste incinerators or process plants, such as industrial waste power plants.

It is preferred that the cleaning agent used in the flue gas cleaning process to obtain the waste material, is composed from at least 50% by weight of one or more of alkaline components. The alkaline components may in principle include any kind of alkaline material. Preferably the alkaline components is selected between alkaline earth metal carbonates, lime stone, dolomite, alkaline earth metal oxide, alkaline earth metal hydroxide, and/or fly ash.

The solid or semi solid waste material may e.g. be comminuted prior to the treatment according to the present method. Preferably the waste material is grinded to an average particle size of less than 10 mm, more preferably less than 2 mm.

The method according to the invention is carried out in a number of steps:

a) preparing an aqueous suspension of the solid or semi solid waste product, said suspension having a pH value of at least 10, b) separating the solid and the liquid material from each other to obtain an aqueous solution of waste material and a solid waste material, and collecting the solid waste material, and c) repeating steps a) and b) one or more times.

When preparing the aqueous suspension, pure water may be used, but in most situations tap water is used due to its lower prise.

The optimal liquid-solid ratio in of the aqueous suspensions prepared in step a) largely depends on the composition of the waste material. Generally the amount of water in the suspensions should be relatively large if the waste material contains large amounts of halogen compounds, such as Cl-compounds.

The invention provides a method in which the waste material can be cleaned using significantly lower amounts of liquid or water compared to the prior art techniques.

It is preferred that the liquid-solid ratio in at least one of the aqueous suspensions prepared in step a) is between 0.5:1 and 50:1 w/w, preferably between 1:1 and 25:1 w/w. Preferably the liquid-solid ratio in all of the aqueous suspensions is between 0.5:1 and 50:1 w/w, preferably between 1:1 and 25:1 w/w. Even more it is preferred that the liquid-solid ratio in at least one of the steps a), and preferably in two or all of the steps a), is between 2:1 and 5:1.

In a preferred embodiment it is possible to have a liquid-solid ratio between 0.5:1 and 2:1 w/w. By having such liquid-solid ratios it is possible to avoid an evaporation step in the process in order to dry the treated material.

The aqueous suspensions prepared in each of the steps a) should preferably have temperatures between 0 and 200° C., more preferably between 5 and below 100° C., and even more preferably between 10 and 30° C. The treatment in step a) may be carried out under pressure, and generally a pressure above atmosphere pressure is used when the temperature exceed 100° C. in order to avoid boiling of the suspension.

The preparation in one or preferably all of the steps a) may be carried out by mixing the solid waste material with optionally tempered tap water. The water may be added to the waste material under stirring or the waste material may be added to the water under stirring. The mixing should preferably be being continued to all waste material is intimately wetted with the water. Preferably mixing is continued for 1–240 min.

It is preferred that the aqueous suspensions prepared in at least one of the steps a) has a pH value between 11 and 13.

Dependant on the amount of halogen compounds in the waste material, the steps a) and b) may be repeated 3 or more times. It is generally preferred that the steps are repeated at least 5 times.

In step b) the solid and liquid materials are separated from each other. This separation may preferably be by using pressure filtration, centrifugal filtration or vacuum filtration.

The waste material obtained from step c) may preferably be subjected to a drying step d). The step of drying the solid waste material in step d) may be carried out in any conventional way e.g. by drum drying.

The solid waste material obtained from steps c) or d) can be reused in a flue gas cleaning process, whereby substantially all of the alkaline component can be utilised in flue gas cleaning. The efficiency of the cleaning agent comprising waste material obtained from steps c) or step d) is as high as when using fresh cleaning agent.

The solid waste material obtained from steps c) or d) normally contains one or more heavy metals including Pb, Cd and Hg. Small amounts of other metals, such as Fe, Zn and Cu may also be present.

Alternatively the solid material obtained from step c) or step d) may therefore be washed with an acidic solution having a pH value below 4, whereby the heavy metals and optionally other metals solutes, and may be separated by filtration to obtain a solution of one or more heavy metals and optionally other metals. The solution of heavy metal or metals may be evaporated to obtain a heavy metal or a mixture of heavy metals and or other metals, or the solution of one or more heavy metals and optionally other metals may be treated with an alkaline material to a pH value between 7 and 10 whereby the heavy metals and optionally other metals precipitated. The obtained heavy metals and optionally other metals may be subjected to a purification process to further extraction and purification of the individual metals. Such methods are generally known in the art, and may e.g. include purification by electrolysing.

The solution of waste material obtained in one or more of the steps b) e.g. at least two or preferably all of the steps b) may preferably be pooled and treated with an acid to obtain a pH value between 7 and 10, preferably between 8 and 9 or between 9.25 and 9.75. Thereby the heavy metals of the solution of waste material will precipitate. The precipitation is preferably done in one stage.

In a preferred embodiment of the invention the solution of waste material obtained in one or more of the steps b) e.g. at least two or preferably all of the steps b) may preferably be pooled and treated with an acid to obtain a pH value between 7 and 10, preferably between 8 and 9 or between 9.25 and 9.75, where the acid is in the form of the acidic solution of heavy metals and optionally other metals obtained from washing the solid material obtained from step c) or step d) with an acidic solution having a pH value below 4. Thereby the heavy metals and optionally other metals from both of the solutions will precipitate. If necessary, further acidic or alkaline materials may be added to obtain a pH value between 7 and 10, preferably between 8 and 9 or between 9,25 and 9,75.

The solution of waste material obtained in one or more of the steps b) may be treated with an acid e.g in the form of an acidic solution by adding the acid or the acidic composition to the solution under stirring and allowing the heavy metals to precipitate. The precipitated heavy metals may be separated from the solution to obtain a substantially pure mixture of heavy metal solids and a solution of one or more halogen containing compounds. The separation methods may include filtration, preferably pressure filtration, centrifugal filtration or vacuum filtration.

The metals may be further purified as mentioned above.

The acidic composition used in the above step may in principle include any kind of acidic composition. Preferably the acidic composition is selected from the group consisting of $HCl$, $HNO_3$, $H_2SO_4$ and acetic acid.

The solution of one or more halogen containing compounds may preferably be evaporated to obtain a halogen salt or a mixture of halogen salts. This salt or salts may be used e.g. as road salt for melting snow and ice.

The invention will now be explained in further details with reference to examples and a drawing wherein FIG. 1 shows a flow-sheet of the process with one stage.

Figure 2:
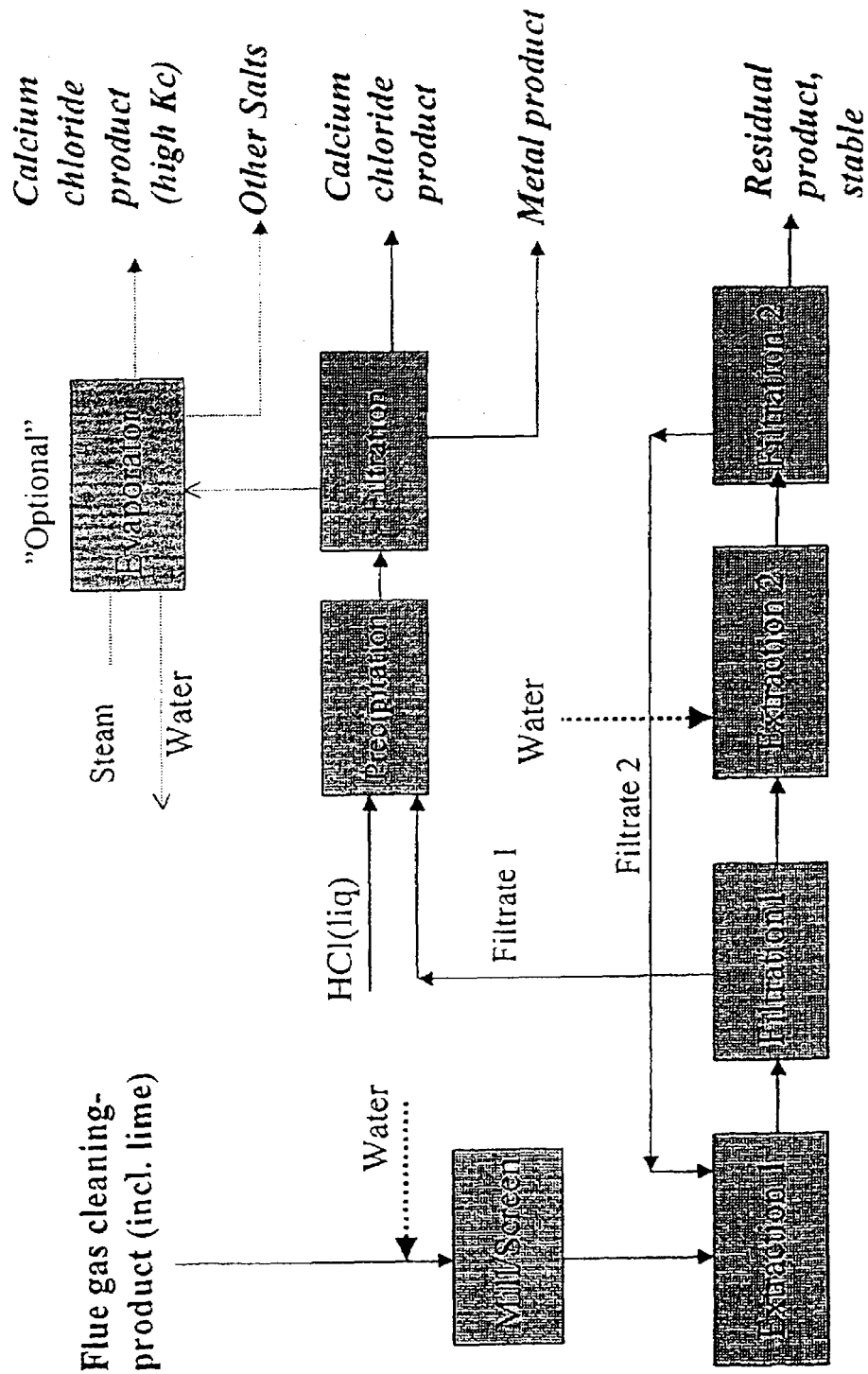

FIG. 2 shows a flow-sheet of the process with two stages.

EXAMPLES

Example 1

A substantially dry halogen containing waste material was obtained from a flue gas cleaning process at Amagerforbrænding, Denmark (AF). The nominal amount of alkaline in the waste material was about 6–8 mol/kg.

The alkaline cleaning agent used in the cleaning process was composed from lime (calcium oxide and calcium hydroxide), and the flue gas cleaning process had been conducted as a semi-dry flue gas cleaning process.

The waste material was ground to an average particle size about 1–2 mm, and 200 g of the waste material was subjected to a first extraction step by suspending it in 400 g water. The mixture was agitated for about 30 minutes at room temperature. The material was filtrated on a vacuum filter, whereby a substantially particle free filtrate was obtained. The remenance was subjected to a second extraction step as described below.

The pH value of the filtrate was measured, and the filtrate was further examined for its Cl content by testing a small sample by titration. The amounts of Cd, Pb, Zn and Cu were determined by atomic absorption spectrophotometer (AAS). The results can be found in table 1.

The filtrate was subjected to a first precipitating step by adding HCl until the pH value reached 11. At this stage the filtrate was vacuum-filtrated to remove the precipitated metal particles, and the obtained filtrate was again examined for its content of Cl, Cd, Pb, Zn and Cu using the same methods as above, and these results as well can be found in table 1.

Extraction Step 1:

TABLE 1

| PH | CL (g/l) | Cd (mg/l) | Pb (mg/l) | Zn (mg/l) | Cu (mg/l) |
|---|---|---|---|---|---|
| >12 | 65 | 0.00 | 464 | 6.9 | 0.07 |
| 11 | 63 | 0.00 | 262 | 4.3 | 0.04 |
| 9.5 | 64 | 0.01 | 0.94 | 0.15 | 0.01 |

The filtrate was subjected to a second precipitating step by adding HCl until the pH value reached 9.5, and the filtrate was again vacuum filtrated and the cleaned filtrate was examined as above.

The remenance obtained from the first extraction step was subjected to a second extraction step by resuspending it in 400 g water, and the extraction step and the precipitation steps was repeated as described above. The results can be found in table 2.

Extraction Step 2:

TABLE 2

| Ph | CL (g/l) | Cd (mg/l) | Pb (mg/l) | Zn (mg/l) | Cu (mg/l) |
|---|---|---|---|---|---|
| >12 | 15 | 0.00 | 12 | 2.4 | 0.07 |
| 11 | 16 | 0.00 | 8 | 2.0 | 0.04 |
| 9.5 | 15 | 0.00 | 0.06 | 0.06 | 0.00 |

The cleaned filtrates from the two extraction steps were pooled.

The pooled filtrates were evaporated, and the residue obtained contained less than 5 ppm lead and less than 0.03 ppm cadmium. This residue may be used as road salt.

The remenance (treated waste material) obtained from the second extraction step was examined. It was found that more than 23% by weight of the waste material was extracted. The amounts of, respectively, Cl, Cd, Pb, Zn, and Cu in the initial waste material, and in the treated waste material are shown in Table 3. 84% by weight of the Cl initially present in the initial waste material was extracted. The nominal amount of alkaline in the treated waste material was about 7.8–10.4 mol/kg. Calculated as $Ca(OH)_2$, it corresponds to an amount of 290–385 g/kg.

TABLE 3

| | Cl (g/kg) | Cd (g/kg) | Pb (g/kg) | Zn (g/kg) | Cu (g/kg) |
|---|---|---|---|---|---|
| 1 kg dry initial AF waste material | 142 | 0.17 | 5.8 | 11.2 | 0.9 |
| 1 kg dry AF waste material | 23 | 0.24 | 5.5 | 15 | 1.2 |

Stability Against Leaching

The leaching-stability of the treated waste material was examined. 100 g of the treated waste material was suspended in 200 g water and left for 20 hours.

The suspension was vacuum-filtrated, and the amounts of Cl and metals extracted (or leached), are shown in Table 4. Finally, the remenance was examined, and the results are shown in Table 4.

TABLE 4

| | Cl | Cd | Pb | Zn | Cu |
|---|---|---|---|---|---|
| leached in 1 l filtrate | 6.7 g | 0.00 mg | 1.0 mg | 0.2 mg | 0.01 mg |
| 1 kg leach-treated AF remenance. | 10 g | 0.24 g | 5.5 g | 15 g | 1.2 g |

From table 3 and 4 it can be seen that 93% of the Cl has been removed and that no leaching as such has been observed from the material in the leaching-test, whereby it must be concluded that the treated waste materials are leaching-stable. Further, the treated waste materials may be reused as cleaning agent in a flue gas cleaning process or it may be further treated to collect the metal compound present in the material.

Example 2

A halogen substantially dry containing waste material was obtained from a flue gas cleaning process at Vestforbrænding, Denmark (VF). The nominal amount of alkaline in the waste material was about 4.5 mol/kg.

The alkaline cleaning agent used in the cleaning process was composed from lime (calcium oxide and calcium hydroxide), and the flue gas cleaning process had been conducted as a wet flue gas cleaning process.

The waste material was ground to an average particle size about 1–2 mm, and 200 g of the waste material was subjected to a first extraction step by suspending it in 400 g water. The mixture was agitated for about 30 minutes at room temperature. The material was filtrated on a vacuum filter, whereby a substantially particle free filtrate was obtained. The remenance was subjected to a second extraction step as described below.

The pH value of the filtrate was measured, and the filtrate was further examined for its Cl content by testing a small sample by titration. The amounts of Cd, Pb, Zn and Cu were determined by AAS. The results can be found in table 5.

The filtrate was subjected to a first precipitating step by adding HCl until the pH value reached 11. At this stage the filtrate was vacuum-filtrated to remove the precipitated metals, and the obtained filtrate was again examined for its content of Cl, Cd, Pb, Zn and Cu using the same methods as above, and these results as well can be found in table 5.

Extraction Step 1:

TABLE 5

| pH | CL (g/l) | Cd (mg/l) | Pb (mg/l) | Zn (mg/l) | Cu (mg/l) |
|---|---|---|---|---|---|
| >12 | 26 | 0.00 | 1.8 | 1.3 | 0.01 |
| 11 | 27 | 0.00 | 0.9 | 0.2 | 0.00 |
| 9.5 | 26 | 0.00 | 0.35 | 0.11 | 0.00 |

The filtrate was subjected to a second precipitating step by adding HCl until the pH value reached 9.5, and the filtrate was again vacuum-filtered and the cleaned filtrate was examined, and these results also can be found in table 5.

The remenance obtained from the first extraction step was subjected to a second extraction step by resuspending it in 400 g water, and the extraction step and the precipitation steps was repeated as described above. The results can be found in table 6.

Extraction Step 2:

TABLE 6

| pH | Cl (g/l) | Cd (mg/l) | Pb (mg/l) | Zn (mg/l) | Cu (mg/l) |
|---|---|---|---|---|---|
| >12 | 6 | 0.00 | 0.8 | 1.0 | 0.00 |
| 11 | 6 | 0.00 | 0.3 | 0.2 | 0.00 |
| 9.5 | 6 | 0.00 | 0.3 | 0.2 | 0.00 |

The cleaned filtrates from the two extraction steps were, pooled.

The pooled filtrates were evaporated, and the residue contained less than 5 ppm lead and less than 0.03 ppm cadmium. The residue may be used as road salt.

The remenance (treated waste material) obtained from the second extraction step was examined. It was found that more than 12% by weight of the waste material was extracted. The amounts of, respectively, Cl, Cd, Pb, Zn, and Cu in the initial waste material, and in the treated waste material are shown in Table 7. 93% by weight of the Cl initially present in the initial waste material was extracted. The nominal amount of alkaline in the treated waste material was about 5.2 mol/kg. Calculated as Ca(OH) it corresponds to an amount of 191 g/kg.

TABLE 7

| | Cl (g/kg) | Cd (g/kg) | Pb (g/kg) | Zn (g/kg) | Cu (g/kg) |
|---|---|---|---|---|---|
| Kg dry initial VF waste material | 58 | 0.16 | 7.7 | 10.4 | 1.1 |
| Kg dry treated VF waste material | 4.3 | 0.17 | 5.0 | 12.7 | 1.2 |

From table 7 it is seen that the tested material is stable against leaching (compare with data in table 4). The treated waste materials may be reused as cleaning agent in a flue gas cleaning process or they may be further treated to collect the metal compound present in the material.

The invention claimed is:

1. A process for treating solid waste from flue gas treatment comprising the steps of:
   1) obtaining a quantity of solid waste from flue gas treatment, wherein said solid waste is composed of compounds selected from the group consisting of fly ash, alkaline earth oxides, alkaline earth hydroxides, and alkaline earth carbonates; and wherein said waste also contains metals and halogen containing compounds;
   2) adding water to said solid waste to create a first aqueous suspension having a pH of at least 10;
   3) separating the first aqueous suspension of step 2) to produce a substantially particle free aqueous solution and collecting a first solid remnant;
   4) creating a second aqueous suspension by addition of a sufficient amount of acid to lower the pH of the substantially particle free aqueous solution of step 3) to a value between 7 and 10, and precipitating metal compounds in the aqueous solution from step 3);
   5) separating the second aqueous suspension of step 4) to produce a second substantially particle free aqueous solution and collecting a second solid remnant;
   6) evaporating the water from the second aqueous solution obtained in step 5) to produce a solid containing alkaline earth halide salts;
   7) collecting and drying the second solid remnant from 5) enriched in metal compounds; and
   8) collecting the first solid remnant from step 3) for optional recycling.

2. A process as claimed in claim 1, wherein steps 2) and 3) are repeated by adding water to said first solid remnant from step 3) to make an aqueous suspension and separating said suspension to produce a substantially particle free solution and collecting a solid remnant, and recycling the substantially particle free solution to form part of the aqueous suspension created in step 2).

3. A process as claimed in claim 1, wherein the second aqueous suspension is created by addition of a sufficient amount of acid to lower the pH of the aqueous solution to a value between 9.25 and 9.75.

4. A process according to claim 1, wherein the aqueous suspension prepared in step 2) has a pH value between 11 and 13.

5. A process according to claim 1, wherein the liquid-solid ratio in the aqueous suspension prepared in step 2) is between 1:1 and 25:1 w/w.

6. A process according to claim 1, wherein the liquid-solid ratio in step 2) is between 2:1 and 5:1.

7. A process according to claim 1, wherein the aqueous suspension prepared in step 2) has a temperature between 0° C. and 200° C.

8. A process according to claim 1, wherein step 2) is carried out by mixing the solid waste material with tap water, the mixing being continued for 1–240 min.

9. A process according to claim 7, wherein step 2) is carried out by mixing the solid waste material with tempered tap water, the mixing being continued for 1–240 min.

10. A process according to claim 1, wherein step 2) and 3) are repeated at least 3 times.

11. A process according to claim 1, wherein step 2) and 3) are repeated at least 5 times.

12. A process according to claim 1, wherein the solid remnant and liquid material are separated from each other in step 3) by filtration.

13. A process according to claim 1, wherein the solid waste from flue gas treatment is obtained from cleaning flue gasses from power plants, industrial waste gases from waste incinerators or process plants, and industrial waste power plants.

14. A process according to claim 13 wherein the waste is composed of at least 50% by weight of one or more of alkaline compounds selected from the group consisting of fly ash, alkaline earth oxides, alkaline earth hydroxides, and alkaline earth carbonates.

15. A process according to claim 1, wherein the solid waste prior to treatment is comminuted.

16. A process according to claim 15, wherein the solid waste prior to treatment is comminuted by grinding the material to an average particle size of less than 10 mm.

17. A process according to claim 15, wherein the solid waste prior to treatment is comminuted by grinding the material to an average particle size of less than 2 mm.

18. A process according to claim 1, wherein the solid material obtained from steps 3), 5) or 7) is reused in a flue gas cleaning process.

19. A process according to claim 1, wherein the solid material obtained from step 5) or step 7) is washed with an acidic solution having a pH value below 4 to obtain a solution of one or more heavy metals.

20. A process according to claim 19, wherein the solution of heavy metal or metals is evaporated to obtain a heavy metal or a mixture of heavy metals.

21. A process according to claim 19, wherein the solution of heavy metal or metals is purified using electrolysis.

22. A process according to claim 19, wherein the solution of heavy metal or metals is pooled with the solution of waste material obtained from step 2).

23. A process according to claim 1, wherein the solution of waste material obtained in step 2) is pooled with an acidic solution of heavy metal, and treated with an acidic composition to obtain a pH value between 7 and 10.

24. A process according to claim 23, wherein the solution of waste material obtained in step 2) is pooled with an acidic solution of heavy metal, is recovered and treated with an acidic composition to obtain a pH value between 7 and 10.

25. A process according to claim 23, wherein the solution of waste material obtained in step 2) is pooled with an acidic solution of heavy metal, is recovered and treated with an acidic composition to obtain a pH value between 8 and 9.

26. A process according to claim 23, wherein the solutions of waste material obtained from step 2) are pooled and treated with an acidic composition.

27. A process according to claim 23, wherein the acidic composition is selected from the group consisting of HCl, $HNO_3$, $H_2SO_4$ and acetic acid.

28. A process according to claim 23, wherein the precipitated heavy metals are separated from the solution to obtain a substantially pure mixture of heavy metal solids and a solution of one or more halogen containing compounds.

29. A process according to claim 28, wherein the precipitated heavy metals are separated from the solution by filtration.

30. A process according to claim 28, wherein the solution of one or more halogen containing compounds is evaporated to obtain halogen salt or a mixture of halogen salts.

31. A process according to claim 28, wherein the solution of one or more halogen containing compounds is recycled to be used for preparing an aqueous suspension of the solid waste in step 2).

* * * * *